United States Patent [19]

Amatsu et al.

[11] Patent Number: 5,471,615

[45] Date of Patent: Nov. 28, 1995

[54] DISTRIBUTED DATA PROCESSING SYSTEM HAVING FRONT-END AND BACK-END COMPUTERS WITH DIFFERENT OPERATING SYSTEMS

[75] Inventors: Keiji Amatsu, Kamakura; Zenhachiroh Butoh, Tokyo; Hiroshi Hirai, Ryugasaki; Minoru Massaki; Hirofumi Morita, both of Kawasaki; Takeo Nakajima, Yokohama; Nobuo Nomura, Mitaka; Mikio Sakaki, Tokyo; Stephen J. Schmandt; Katsuhiro Tanaka, both of Tokyo, all of Japan

[73] Assignee: International Business Machines Corporation, Armonk, N.Y.

[21] Appl. No.: 263,954

[22] Filed: Jun. 22, 1994

Related U.S. Application Data

[63] Continuation of Ser. No. 988,657, Dec. 10, 1992, abandoned.

[30] Foreign Application Priority Data

Dec. 26, 1991 [JP] Japan ..................... 3-344732

[51] Int. Cl.⁶ ............................. G06F 13/00; G06F 15/16
[52] U.S. Cl. ............. 395/200.03; 395/650; 395/200.05; 395/200.16; 364/230; 364/228.9; 364/230.3; 364/DIG. 1
[58] Field of Search .................... 395/650, 700

[56] References Cited

U.S. PATENT DOCUMENTS

| | | | |
|---|---|---|---|
| 4,694,396 | 9/1987 | Weisshaar et al. | 364/300 |
| 4,849,877 | 7/1989 | Bishop et al. | 364/200 |
| 4,914,570 | 4/1990 | Peacock | 364/200 |
| 5,060,150 | 10/1991 | Simor | 364/200 |
| 5,109,486 | 4/1992 | Seymour | 395/200 |
| 5,113,519 | 5/1992 | Johnson et al. | 395/600 |
| 5,123,094 | 6/1992 | MacDougall | 395/375 |
| 5,144,692 | 9/1992 | Baker et al. | 395/425 |
| 5,165,018 | 11/1992 | Simor | 395/300 |
| 5,228,137 | 7/1992 | Kleinerman et al. | 395/500 |

OTHER PUBLICATIONS

"Operating System Concepts" by Peterson et al pp. 457–502 1985.

"VAX connectivity: changing the vision of integration into a reality" by Peg. Killmon, Government Computer News Feb. 6, 1989 v 8 n 3 p. 61(3).

"Sun's open system made by marketplace; unlike minis, Unix machines, PCs and even MVS can be glued by NFS" by Jerry Cashin, Software Magazine Oct. 1989 v 9 n 12 p. 72(4).

*Primary Examiner*—Kevin A. Kriess
*Assistant Examiner*—Michael T. Richey
*Attorney, Agent, or Firm*—William A. Kinnaman, Jr.; Peter L. Michaelson; Jeremiah G. Murray

[57] ABSTRACT

A distributed data processing system is provided in which two computers, each running under a different operating system, are coupled so that jobs initiated by a first one of the computers can be executed on a second computer by using the resources of the second computer. This enables the user of the first computer to use the second computer under the environment of the first computer. The first computer acts as the interface between the user and the data processing system. Service programs running on the system can handle or provide for input/output operations during the execution of jobs on the second computer so that the jobs seem to the user of the first computer to be executed on the first computer. The system has means for creating a dummy file in the file system of one operating system which is used as a place holder for a corresponding file in a storage device attached to the other operating system, and accessed by programs controlled by that other operating system.

5 Claims, 8 Drawing Sheets

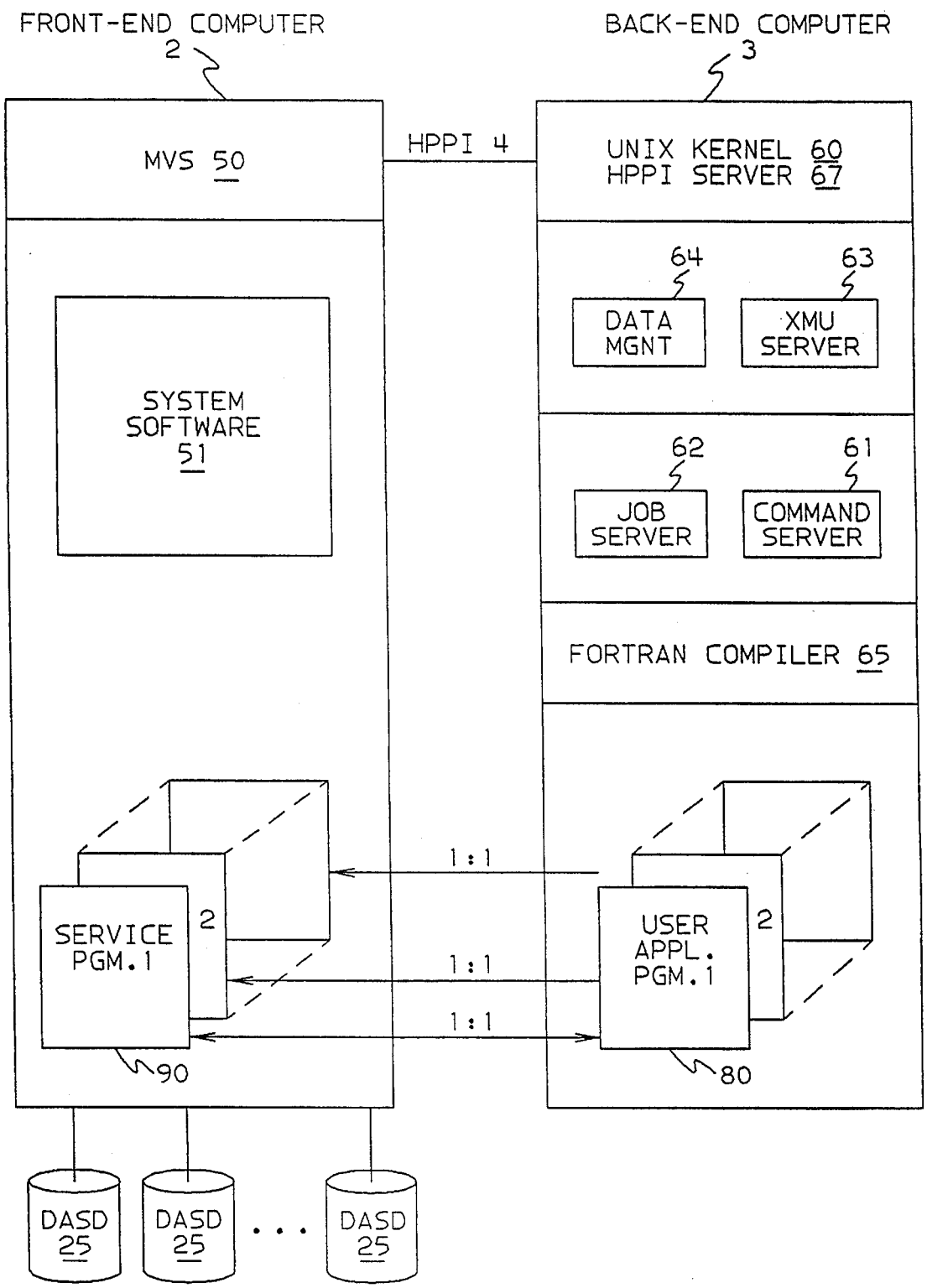

FIG.6
EXECUTABLE LOAD MODULE LIBRARY (PDS) FORMAT
PDS DIRECTORY FORMAT
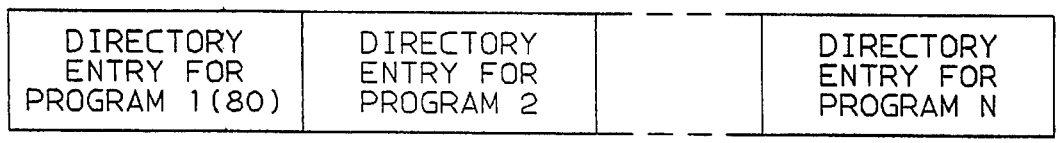
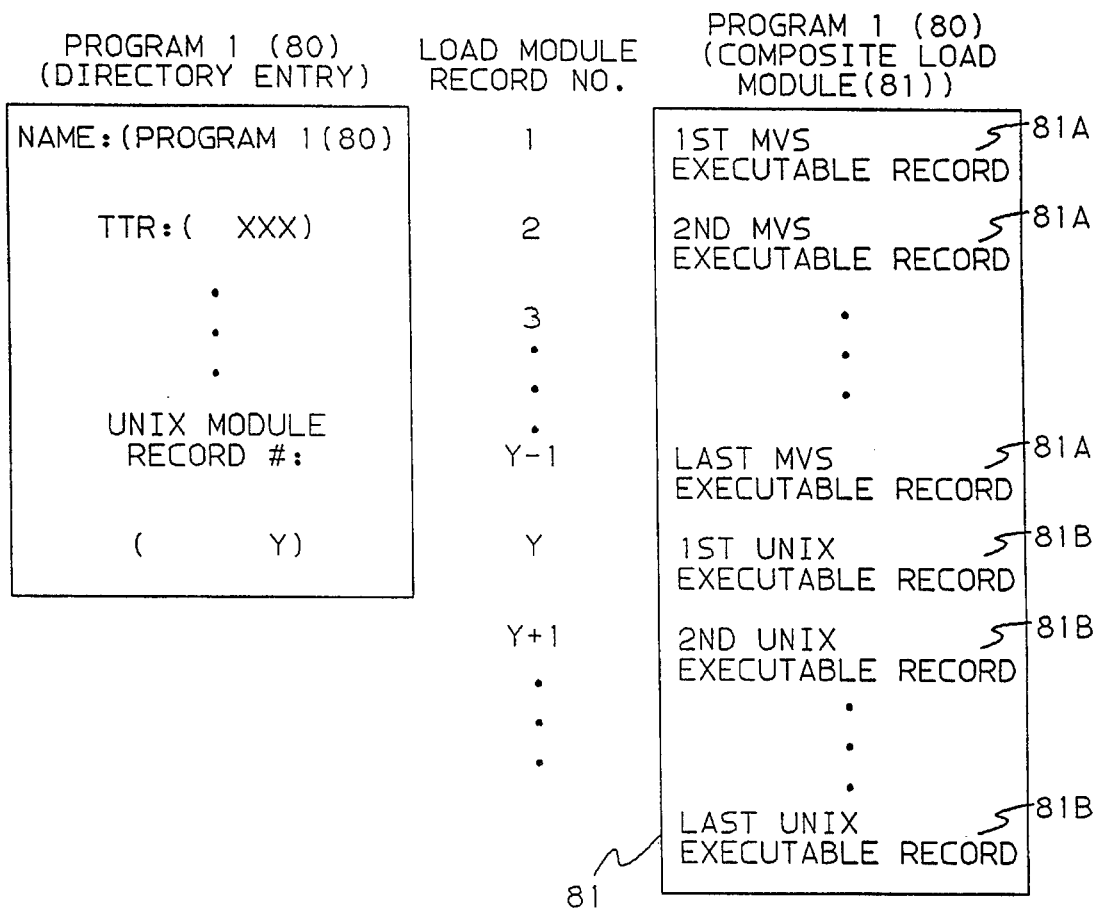

FIG. 8
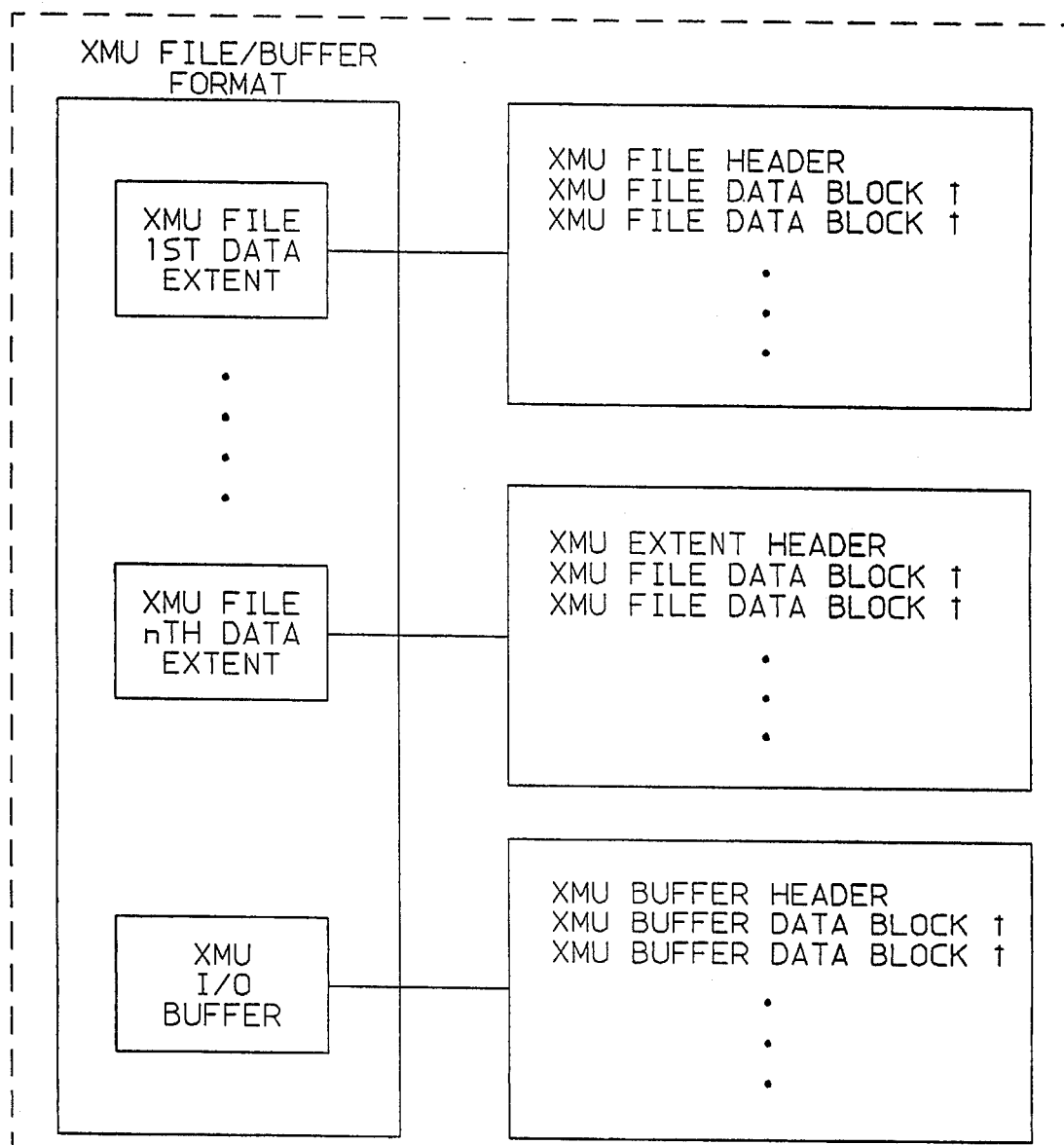
(†) FORMAT OF XMU FILE/BUFFER DATA BLOCK
N=BLOCK SIZE FOR THIS FILE
EF=END OF FILE FLAG
**=RESERVED FIELD
LL=LENGTH OF VALID DATA (FOR FB, U FORMAT FILES)

DISTRIBUTED DATA PROCESSING SYSTEM HAVING FRONT-END AND BACK-END COMPUTERS WITH DIFFERENT OPERATING SYSTEMS

CROSS REFERENCE TO RELATED APPLICATION

This application is a continuation of copending patent application Ser. No. entitled "System Architecture for Distributed Data Processing", filed on Dec. 10, 1992 as 07/988,657, now abandoned.

FIELD OF THE INVENTION

The present invention relates to system integration and distributed data processing and, more particularly, to a system architecture which allows several unlike operating systems running on different computer hardware to be integrated into a single distributed data processing system.

"Distributed" means that jobs initiated and controlled by one computer system, referred to as a front-end computer, can be executed on another computer system, referred to as a back-end computer, by using the resources of the back-end computer.

The present invention allows two or more unlike computer systems to be coupled and allows users on one of these computer systems to use the unique features of the other computer systems while maintaining the existing file system and job control features of the one computer system.

BACKGROUND ART

There are many kinds of computer systems in use now. In terms of the purpose of a computer system, there are computer systems ranging from a general purpose computer used for various kinds of information processing in the business field as well as in the scientific field to a special purpose computer system specialized for a particular type of information processing, for example, performing numerically intensive calculations.

A general purpose computer is designed to meet various kinds of requirements of users at one time and is not specialized for a particular type of calculation. IBM 3090 processor (IBM is a registered trademark of International Business Machines Corporation, USA) is a general purpose computer.

A so-called super computer is a special purpose computer exclusively specialized for numerically intensive computing, which is needed for some scientific and business applications, for example, structural analysis, crash analysis, fluid dynamics, magnetic field analysis, LSI design, weather forecast and financial design. A super computer employs special computer design. For example, they employ vectorization, pipelining and parallel processing, in order to obtain high peak floating number execution performance around several tens of GFLOPS (Giga Floating Point Operations Per Second). The design of a general purpose computer is not aimed at high peak floating number execution performance but at high throughput, short turnaround time, availability, and etc. to meet various kinds of user requirements at one time.

There are also various kinds of operating systems in use now. Without software, computers are mere hardware which cannot do any work. It is software that gives users of computers what the users want from the computers. The operating system is a software which effectively controls the execution of other software, so-called application or user programs which provide a user with a particular work the user needs. An operating system provides services, such as, resource allocation, scheduling, input/outputs control, and data management in a computer.

Multiple Virtual Storage, (hereinafter referred to as MVS) is an operating system for a general purpose computer of IBM. UNIX (a registered trademark of UNIX International) is another operating system developed by Bell Laboratory and used in many computers including super computers.

Since the number of general purpose computers in use and the number of the users and operators accustomed to general purpose computers are much larger than those of super computers, it is desirable to make available a super computing environment to users of a general purpose computer without any training about a super computer and its operating system.

One solution is to couple a general purpose computer and a super computer so as to make up a distributed processing system and to use the general purpose computer as a front-end processor and the super computer as a back-end processor. If all input and output operations are handled by the front-end processor and numerically intensive computing is handled by the back-end processor in the coupled system, only the front-end processor system is visible to the users and the back-end processor will be almost transparent to the users.

However, there are many problems to be solved to couple a general purpose computer and a super computer, each running under control of a different operating system, for example, MVS or UNIX, so as to make up a distributed processing system. For one thing, these different operating systems have different file systems. MVS has a horizontal file system whereas UNIX has tree-like file system. Also, the physical formats of UNIX file and MVS files are different. Files in this system must be accessible to both operating systems running on the front-end and the back-end computer.

This invention includes new approaches to two areas of distributed data processing, remote program initiation and file service. Currently there are several types of remote program initiation methods. One type is remote job entry. Current remote job entry methods such as IBM's remote job entry (RJE) system allow users to send job control statements from one system to another. Some types of data (system input stream, SYSIN) can be sent along with the job control statements. Another method in the prior art is by remote user logon to a system, which then allows the user to send the commands necessary to initiate programs on the remote system.

This invention is a substantial improvement on these methods. The current methods require the user to understand the job entry procedure language, or the commands, of the target remote system on which the user wishes to execute his or her programs. This invention allows the user to initiate remote work in exactly the same way as he/she initiates a job on his/her own local system. This is an enormous advantage when the remote system is controlled by a different operating system. Since every operating system uses different commands for job submission, file specification, etc., it was extremely difficult for users to use a remote system controlled by a different operating system prior to this invention.

Another method of remote program initiation which is in use in commercial computing systems is the use of remote procedure calls from programs on one system to programs on another system. With this method it is possible to make the remote system almost invisible so that the user may not have to be aware that the called program executes remotely. But this method doesn't provide a way to specify local files to be used as data for remote programs. Also it requires modification of the user's programs. The present invention allows the local file system to be accessed by the remote programs, and also permits programs that currently work on the local system to simply be recompiled and then run on the remote system. They do not have to be rewritten or modified by the user.

There are many existing file service systems. Many commercial systems are available which allow one system to act as a file depository, which stores files and sends them to another system on demand. Almost all of these systems, however, are only for homogeneous operating systems. Some file server systems do allow file serving among heterogeneous operating systems. For example, the University of Michigan's File Server system allows UNIX files to be stored on a mainframe computer running the MVS operating system. Even this system, however, only allows the heterogeneous files to be stored. They cannot be used by MVS programs.

The present invention is superior because only this method allows files to be used by programs running under very different operating systems. Furthermore, the physical format of the files do not have to be changed as part of file accessing by the remote heterogeneous system. Also, unlike other methods in the current art, the file name does not have to be translated from one name to another in order to be accessed by a different operating system.

Japanese published unexamined patent application No. 63-59639 (JA patent Appln. No. 61-204353) discloses a file system compatible with different operating systems, such as, UNIX and another operating system used in a general purpose computer. The solution described in that application is not applicable to the distributed processing environment. Furthermore, the means of achieving file compatibility in that application is inferior to the means used in this invention. The means of achieving file compatibility by the solution described in the Japanese application requires changing the format of the data files and transforming the file names.

The solution used in this invention does not require changing the data format, nor is the file name ever changed. Also, many different file formats, such as fixed block, variable blocked, spanned, sequential, direct and partitioned formats, can all be used by the method of the present invention.

An object of the present invention is to solve the problems in the field of system integration, specifically, the problems of combining two or more hardware and software systems, i.e., a front-end computer and a back-end computer, which feature different operating systems so as to make up a distributed processing system in which jobs initiated on a front-end computer are executed on a back-end computer by using resources of the back-end computer.

The possible motivations for creating such a system are many, e.g., taking advantage of special hardware available on one or more of these systems; merging multiple databases or applications that exist on more than one system; and allowing an application that currently runs on one system to access data files of another system.

The value of any such integrated system (both in terms of marketability and value to the user/purchaser) depends on the extent to which the following key goals can be achieved: maintaining the value of existing user programs by allowing them to continue to be used on the integrated system with the smallest possible modification (preferably none); allowing end users to use the full function of the integrated system without being aware of complex underlying system software; allowing operators and other support staff to control and monitor the integrated system without having to understand complex underlying system software; not requiring end users or operators to learn a new set of procedures; and minimizing the modifications to system level software needed to integrate two or more independent systems.

SUMMARY OF THE INVENTION

This invention consists of a novel system architecture which provides a means for file sharing between operating systems with fundamentally differing file systems and a means for initiating and controlling user jobs which can utilize the resources of multiple systems.

This invention allows unlike systems to be coupled and allows users on one of these machines to use the unique features of the other machine while continuing to use the existing file system and job control features of the first machine.

Even though the system which is added as a back-end processor is completely different from and fundamentally incompatible with the front-end processor (e.g., the means for executing jobs and specifying which files are to be used for those programs, and the naming conventions and logical structure of the file system, the internal organization, and character set of the data files are completely different), the invention keeps those differences transparent to the user and the system operator.

Due to the unique system architecture of this invention, a special purpose machine running a different OS can be connected to an existing machine, and users of the existing machine can immediately use the special purpose machine without having to re-write their programs (only re-compilation of the programs is required) or learn how to use the new operating system. Furthermore, this is achieved without requiring major modifications to the kernel structures of either operating system.

The key features of this invention are as follows: One system where user jobs are submitted is referred to as the "originating system." Another system where the jobs are fully or partially executed is referred to as the "target system." The means of submitting work in the originating system is unchanged. Jobs which execute partially or completely on the target system can be submitted and controlled from the originating system using the existing methods of job control. Existing user programs which currently run on the originating system can be used without modification (re-compilation is required). Existing user data files from the originating system can be used "as is" without modification (this includes files with record or block formats, or character coding unsupported by the target system OS). Existing job control language procedures used with the originating system can be used "as is" without modification, including program and file specification statements.

Moreover, this invention has the following features: A series of job steps, some or all of which execute on the target, can be submitted using standard job control procedures from the originating system. Data files may be staged in a unique file system, outside of the file system of either the originating or target systems. The originating system maintains control of and allocates space for a file buffer memory of the target system. The target system can be used without requiring any I/O devices of its own. Using standard multiple system control features of the originating operating system, more than one machine under the control of different instances of the originating OS can be attached to and use a single target system.

According to the present invention, one of two computers (a front-end computer and a back-end computer) in a distributed processing system, each computer running under a different operating system, is used as a user interface (i.e., a front-end computer) of the distributed processing system.

According to the present invention, there is provided control programs running on the front-end and back-end computers to create an address space in the back-end computer for a job initiated on the front-end computer and then executed on the back-end computer.

Moreover, according to the present invention, a separate file system distinct from the file systems of the two different operating systems is provided. The file system of the present invention has means for creating a dummy file in the file system of one operating system which is used as a place holder for a corresponding file in a storage device attached to the other system, and accessed by programs running on that other system.

Moreover, according to the present invention, a distributed processing system of the present invention has means for creating, for each of the files, a load module executable by the operating system of a front-end computer and a load module executable by the operating system of a back-end computer. These two load modules are combined into one file so that the front-end computer can execute these files under the control of its operating system and a service program can then pass the back-end executable module to the back-end computer for execution.

Furthermore, according to the present invention, the coupled distributed processing system of the present invention includes a service program for an application or user program running on a back-end computer. The service program runs on a front-end computer in parallel with the application program running on the back-end computer so as to perform I/O operations on behalf of the application program.

Furthermore, according to the present invention, a back-end computer has a storage unit which is divided into two portions. One of which is used for communication between a front-end computer and the back-end computer under control of the operating system of the front-end computer. The other of which is used for the operation of the back-end computer under control of the operating system of the back-end computer.

Furthermore, according to the present invention, a front-end computer has a non-volatile storage device under control of the operating system of the front-end computer to store all files necessary for jobs initiated by the front-end computer and then executed by a back-end computer.

The foregoing and other additional features and advantages of the present invention will become more apparent from the following detailed description of a preferred embodiment thereof, presented hereinbelow in conjunction with the accompanying drawings.

BRIEF DESCRIPTION OF THE DRAWINGS

FIG. 4 is a schematic illustration of a system software configuration in the front-end and back-end computers.

FIG. 6 is a schematic illustration of a composite module of the invention.

FIG. 8 is a schematic illustration of XMU file structure used in the preferred embodiment of the present invention.

DETAILED DESCRIPTION OF THE INVENTION

Hardware Configuration

Figure 1:
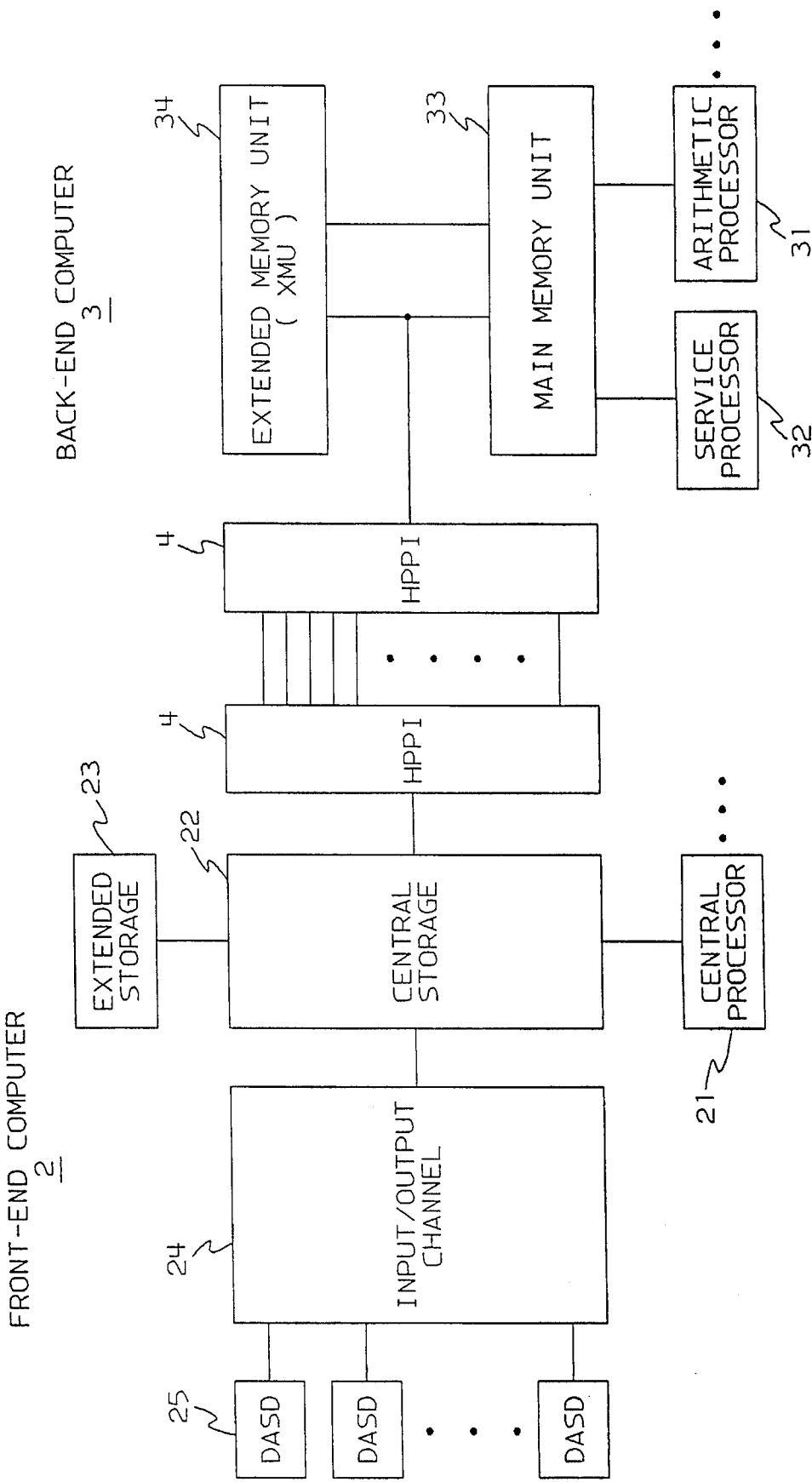
FIG. 1 is a schematic illustration of a distributed data processing system according to a preferred embodiment of the present invention.

Referring to FIG. 1, a distributed processing system 1 of a preferred embodiment of the present invention is shown. The system 1 includes a general purpose computer 2 as a front-end computer, for example, IBM 3090 processor, running under control of MVS operating system and a super computer 3 as a back-end computer, for example, NEC super computer (NEC is a registered trademark of Nippon Electric Corporation, Japan), running under control of UNIX operating system. The front-end computer 2 and the back-end computer 3 are coupled through a communication link 4 which is a high performance parallel interface (hereinafter referred to as HPPI). The HPPI 4 follows American National Standard Institute's (ANSI) X3T9.3 standard. The HPPI 4 provides a 100 megabytes-per-second data transfer channel. The front-end computer 2 supports up to two HPPI links. The back-end computer 3 supports up to eight HPPI links. Therefore, up to eight front-end computers 2 can be connected to one back-end computer 3.

In the distributed processing system 1, the front-end computer 2 works as an originating computer which initiates and transfers jobs to the back-end computer 3, a target computer, which executes the jobs and returns the results to the front-end computer 2.

The front-end computer 2 contains one or more central processors 21, a central storage 22 containing from 12 megabytes (MB) to 256 MB memory, an extended storage 23, and one or more input/output channels 24 which are connected to one or more direct access storage devices (DASDs) 25, that is, disk storage devices, e.g. IBM 3390 DASD. Users (not shown) of the distributed system 1 are connected to the front-end computer 2 through a communication link (not shown).

The back-end computer 3 contains one or more (up to four) arithmetic processors 31, a service processor 32, a main memory unit 33, and extended memory unit (hereinafter referred to as XMU 34). The back-end computer 3 does not have any DASD to store its programs and data except a small disk drive (not shown) for only storing a program for initializing and bootstrapping the back-end computer 3 on power-on operation and storing error log. All programs including source programs, object modules, libraries, load modules and data for execution on the target computer 3 are stored in the DASDs 25 on the front-end computer 2. All input/output operations, user interface, job management, data management, and other back-end computer related services are provided for the back-end computer 3 by the front-end computer 2. All I/O requests to these data sets in the DASDs 25 during a back-end computer program execution are routed to the front-end computer 2 through the HPPI 4 for data management service.

The back-end computer 3 provides the users of the system 1 with supercomputing capability. Peak floating point number execution performance of the back-end computer 3 is from 1.3 GFLOPS to 22 GFLOPS depending on the number of arithmetic processors 21 contained in the back-end computer 3. This peak performance is achieved by short machine cycle time (2.9 nanoseconds), a large capacity of vector registers (maximum 144 kilobytes per arithmetic processor 31), multiple vector pipelining and chaining (maximum 16 pipelines per arithmetic processor 31), and parallel processing (maximum four arithmetic processors 31). In order to satisfy numerically intensive computing requirements, the main memory unit 33 of the back-end computer 3 can contain from 64 MB to 2 gigabytes (GB) memory.

Figure 2:
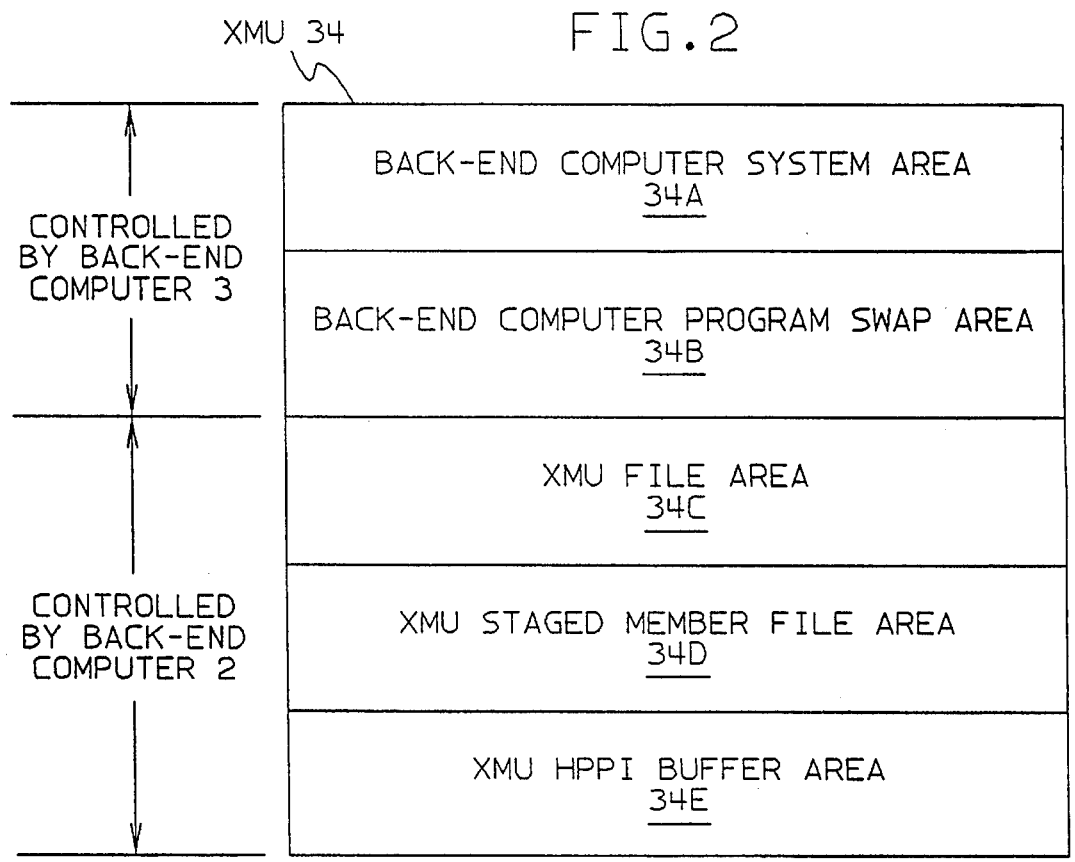
FIG. 2 is a schematic illustration of an extended memory unit of a back-end computer in the system of FIG. 1.

The XMU 34 of the back-end computer 3 can contain from 1 GB to 16 GB memory. The XMU 34 can sustain very high data throughput (2.75 gigabytes per sec). As shown in FIG. 2, the XMU 34 is used for a back-end computer system area (root file system area) 34a, a back-end computer program swap area 34b, an XMU file area 34c to speed up file input/output operations of SAM (sequential access method), PAM (partitioned access method), and DAM (direct access method), an XMU staged member file area 34d to speed up program loading time and link-edit library access time, and an XMU HPPI buffer area 34e to receive data from HPPI 4. The back-end computer system area 34a and the back-end computer program swap area 34b are under control of the operating system of the back-end computer 3. The XMU file area 34c, the XMU staged member file area 34d and the XMU HPPI buffer area 34e are under control of the operating system of the front-end computer 2.

Inter-System Communication

Figure 3A:
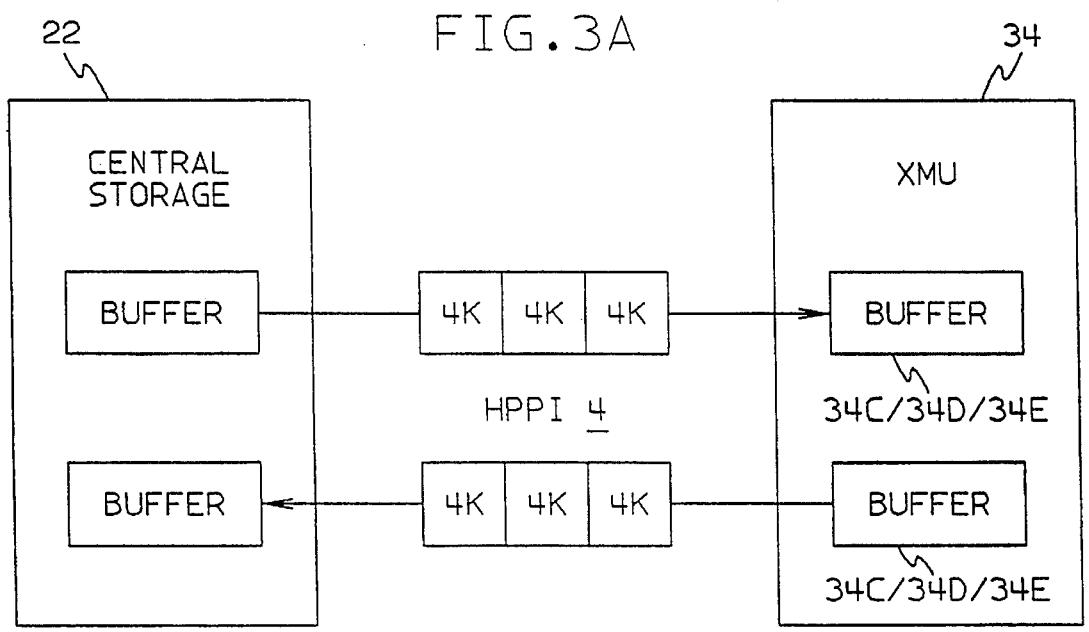
FIGS. 3A and 3B are schematic illustrations of a communication link (High Performance Parallel Interface) between a front-end computer and the back-end computer of the system shown in FIG. 1.
Figure 3B:
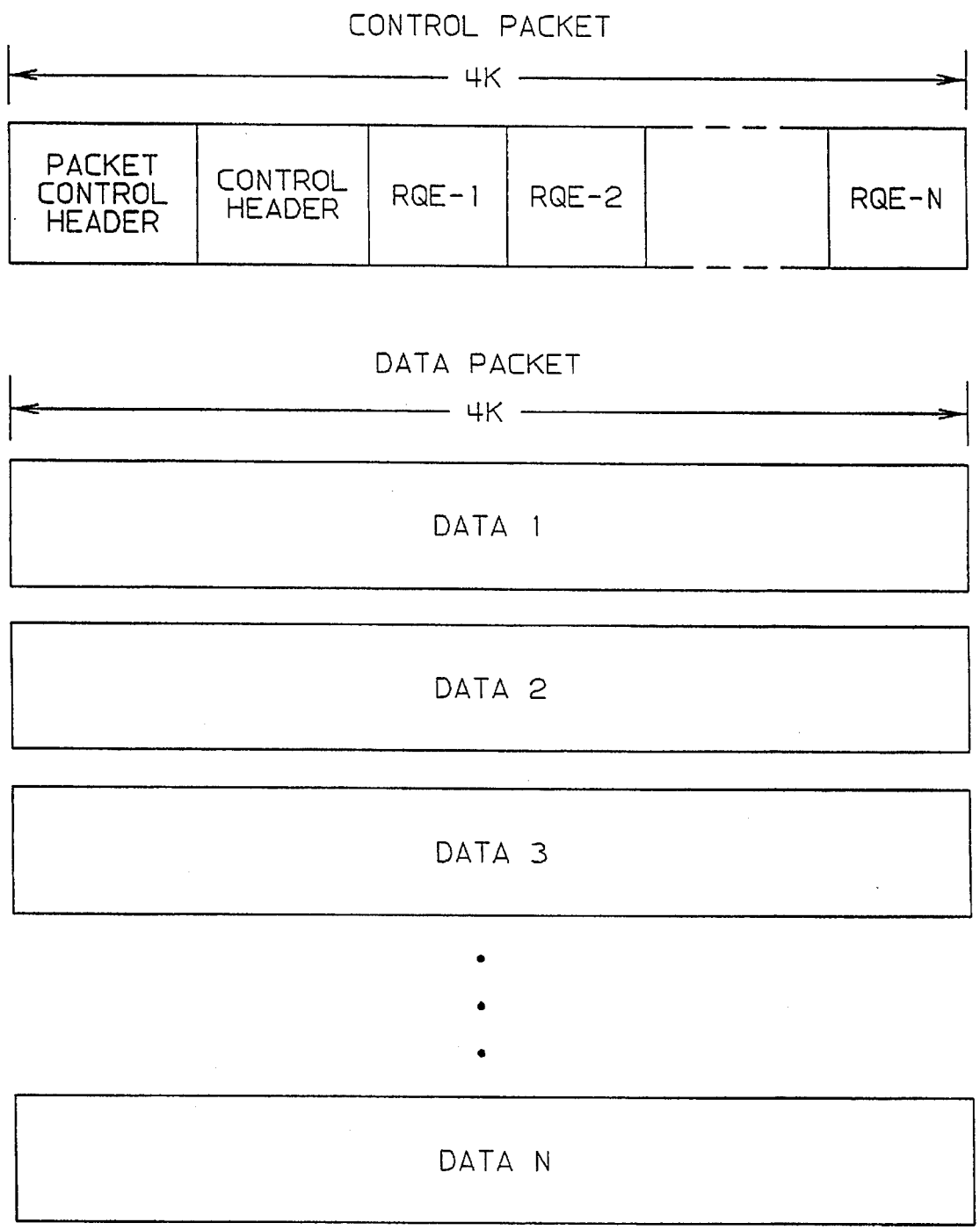

The front-end computer 2 and the back-end computer 3 communicate via a HPPI 4. This interface is described in ANSI document X3T9.3 issued by the ANSI Standards Committee X3. As shown in FIG. 3A, in the front-end computer HPPI hardware implementation, data is transferred from the central storage 22 through HPPI 4 in 4K byte pages. Each transmission consists of one or more 4K byte blocks. As shown in FIG. 3B, the first block of each transmission contains control information. This 4K byte block is called a control packet. Each control packet contains a control header, and 1 or more request elements. Each request element (RQE) represents a communication request between a system component on the front-end computer 2 and a system component on the back-end computer 3, for example, a system control command to start or terminate a batch job, or a data management request to read or write data on behalf of a user application program.

Each request element packet may be accompanied by 1 or more 4K byte blocks of data. The data blocks associated with each request element within a control packet are sent over the HPPI interface immediately following the control packet. The data associated with a single RQE is called a data packet. The data packets for the RQEs are transmitted immediately after the control packet, in the same order as the RQE's within the control packet. Thus each transmission consists of a single control packet with 1 or more RQE's, followed by a data packet per RQE for those RQEs which have accompanying data. The communication's functions which are initiated via an RQE are described below.

System Software Structure

Referring now to FIG. 4, each hardware system of the front-end computer 2 and the back-end computer 3 is controlled by its own independent operating system. The back-end computer 3 runs entirely independently of the front-end computer 2. The back-end computer 3 has its own kernel which performs all the vital functions of task dispatching, storage management, etc. It has its own file system and is not directly controlled by the front-end computer 2.

System Software Structure of the Front-End Computer 2

In the front-end computer 2, system software 51 of the present invention is added on top of a standard MVS operating system 50. The system 1 of the present invention allows users to access the back-end supercomputer 3 via the standard MVS user interfaces for job submission and control. It also allows interactive use of the back-end supercomputer 3 via a standard MVS interactive interface such as time sharing option enhanced (TSO/E) program.

At the same time as providing a special purpose supercomputer processing environment, this standard MVS system continues to support other general computing work unrelated to the system 1 of the present invention. This general purpose work can be performed in parallel to jobs of the present invention and many users may not even be aware that the system 1 of the present invention exists. For example, standard batch jobs and such subsystems as a transaction processing system (e.g. IBM's customer information control system (CICS)), or a database (e.g. IBM's information management system (IMS) or data base 2 (DB2) database system). End users who use standard MVS system on the front-end computer 2 can continue to use resources of the front-end computer 2 and the MVS software via IBM's TSO/E interactive user interface.

Figure 5:
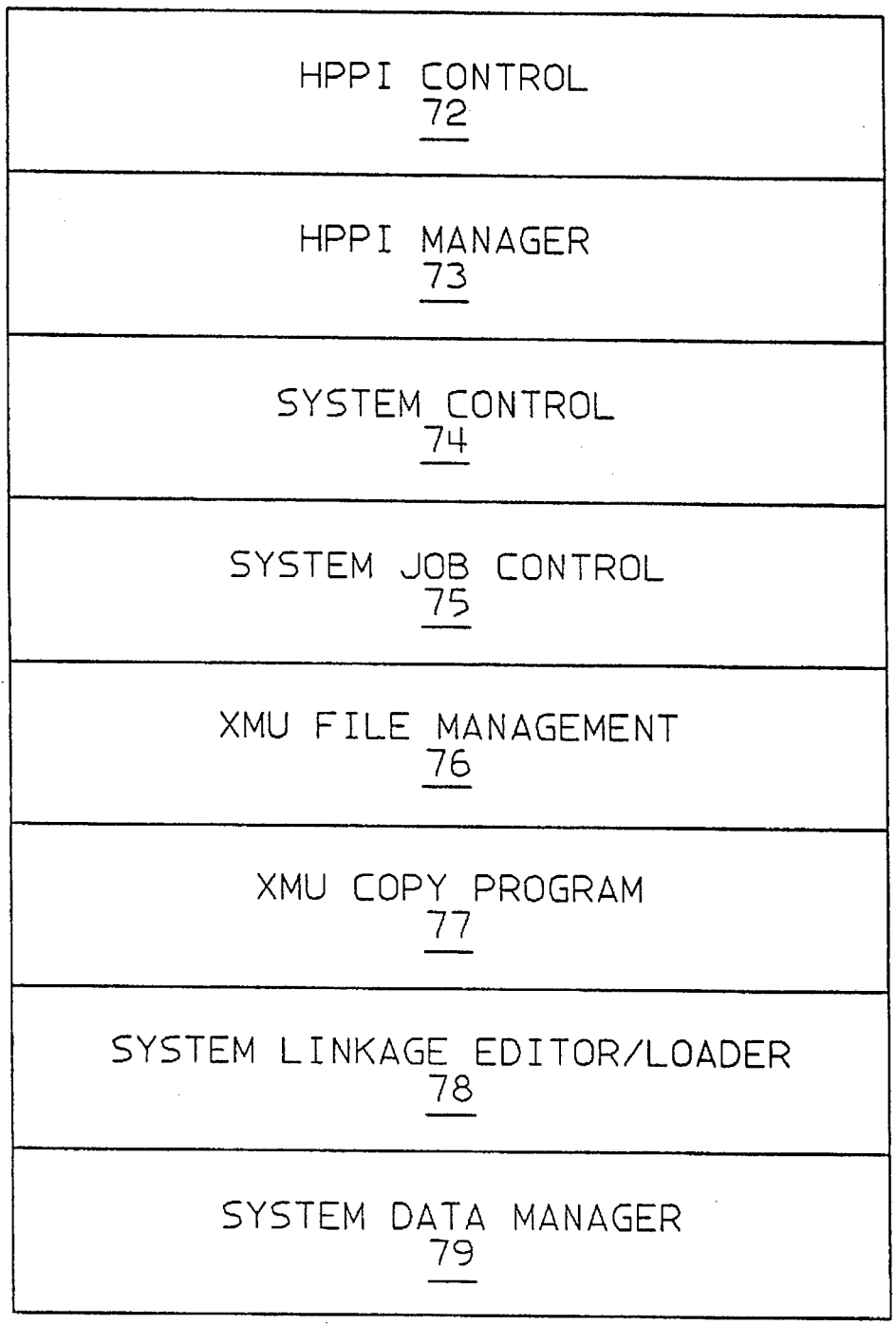
FIG. 5 is a schematic illustration of a system software in the front-end computer.

As shown in FIG. 5, the software 51 on the front-end computer 2 for the system 1 of the present invention consists of the following components: HPPI control 72; HPPI manager 73; system control 74; system job control 75; XMU file management 76; XMU copy program 77; system linkage editor/loader 78; and system data manager 79.

The system controller 74 and job controller 75 runs as an MVS subsystem. The HPPI Manager 73 runs in its own address space and provides all other programs with the means to send and receive data over the HPPI link via the standard MVS HPPI control program 72. Additional system programs (77, 78, and 79) run in the address space allocated to user jobs and assist with the data and file management functions for user jobs.

System Software Structure of the Back-End Computer 3

Returning to FIG. 4, the software of the system of the present invention is added on top of the existing UNIX system 60 in the back-end computer 3, too. This software includes a layer 67 which controls the back-end computer HPPI link and routes HPPI requests and data packets to other system components. The components served by this HPPI server program 67 are command and job servers 61 and 62, an XMU server 63, a data manager 64, and a modified Fortran compiler 65.

The command server 61 is an independent process which awaits UNIX system commands which can be sent from the front-end computer 2. For each command, a command process is started, and an acknowledgment and any response is returned to the front-end computer 2.

The job server 62 is an independent process which awaits job initiation requests from the front-end computer 2. When a job initiation request is received, the job initiator creates a job process and sends an acknowledgment to the front-end computer 2. When the job ends, the job server 62 notifies the front-end computer 2.

The XMU server 63 waits for and serves requests from MVS to read or write data to or from the XMU 34. On a request to read from the XMU 34, the XMU server 63 accesses the XMU 34 and sends the data with the response. On a write request, the data is written directly into the XMU 34 and the XMU server 63 sends an acknowledgment back to the front-end computer 2. This service is used by the XMU copy program 77 in the front-end computer 2 and also is used to read and write the 4K header block for XMU resident files.

The data manager 64 is a set of programs which are invoked by a back-end job for I/O. This includes requests to write to the system or user console as well as for file access. All I/O operations, e.g. file open, read, write, close, console read or write requested by a user program, are trapped by the system and routed to the data manager 64. The data manager 64 transfers data between the user program and the XMU file buffers 34. File control operations are passed through to the front end system, as are console I/O requests. When the file buffers of XMU 34 become full on a write operation the data is passed through to be stored on MVS DASDs 25. Similarly, on a read operation when no more data is waiting in the XMU buffer, the read request is passed on to MVS 50, which reads more data from the disk data set.

The Fortran compiler 65 of the back-end computer 3 is modified to conform to the external specification of the Fortran compiler of the front-end computer 2. This ensures that users of the front-end computer 2 will not have to modify their Fortran programs to use the system 1 of the invention, nor will they have to learn the subtle differences between two different versions of Fortran. It also provides a key mechanism for identifying MVS files to be used by back-end jobs.

System Manager

The system manager 74 runs as an MVS subsystem, using standard MVS subsystem interfaces. It's functions include initializing control blocks and starting the address spaces and job necessary for the system 1 of the present invention, such as the HPPI control 72, HPPI manager 73, ISL and dump programs. It also periodically monitors the back-end computer 3 to ensure that it remains active and in good health.

The system manager 74 also executes all operator commands used for controlling both the front-end and back-end computers 2 and 3. All operator commands are routed to the system 1 through the normal MVS subsystem interface. These are scanned for the starting keyword which identifies them as a system command. Any system command will be executed on the front-end computer 2 or simply passed to the back-end computer 3.

HPPI Communications Management

On both the front-end and back-end, system use of the HPPI communications link is managed by an HPPI communications program. Besides controlling the actual HPPI communications hardware, these programs manage queues of RQE's and data. Outgoing requests are packaged into control and data packets, and incoming packets are sorted, and their respective recipients are notified.

Initialization of System 1

An MVS operator console (not shown) is used to start, terminate, control and monitor system 1, both the system within MVS 50 and the back-end computer 3 in its entirety. Before starting the system 1 from MVS 50, the back-end computer 3 must be initialized from a back-end hardware console (not shown) of the service processor 32. From the MVS console, the system software 51 is started as a task. This system software 51 starts the HPPI control 72 and HPPI manager 73 address spaces and performs all other initialization tasks such as initializing the XMU file manager 76.

Then, an MVS ISL (Initial System Loading) program is started. As part of the HPPI control 72 initialization, communication is established on the HPPI interface 4 (connect-request handshake). The system control program 74, before starting the ISL program, exchanges system identification information with a back-end computer bootstrap loader in the service processor 32, sets the system clock of the back-end computer 3, and obtains information concerning the hardware configuration of the back-end computer 3 (e.g. the number of AP's 31, the size of the main memory unit 33 and the size of the XMU 34, the ending extended storage address of the operating system of the back-end computer 3 in the XMU 34 ).

The MVS ISL program starts the ISL process by sending a boot command to the back-end computer bootstrap loader, specifying the file name of the MVS file in the DASD 25 which contains the back-end computer (UNIX) OS kernel. The bootstrap loader then reads the kernel file into the XMU 34, by passing a series of read requests to MVS, until the MVS ISL program indicates the end of the kernel file has been reached. At this point the MVS ISL program terminates.

The bootstrap loader of the back-end computer 3 continues by loading the kernel's own loader into main memory unit 33 and handing control over to the kernel. The kernel then completes loading itself into the main memory unit 33 from the XMU 34, and performing all other initialization functions. When the kernel 60 has completed its initialization, it sends an "ISL complete" message to the system control 74 in the front-end computer 2. Both control programs 74 and 62 are then prepared to start initiating supercomputing jobs.

Execution of Programs

A user who wishes to execute a program 80 on the back-end computer 3 submits the job just as any standard MVS program. For each job step which must be executed on the back-end processor 3, a STEPLIB must be specified which specifies a program executable on the back-end processor (either a disk partitioned dataset (PDS) member which contains a program created by the loader program 78, or an XMU library—both types of files are described below). This job passes through the standard MVS job initiation process. This process includes standard MVS file allocation, creation of an MVS address space for the job, and the loading and start up of an MVS executable program. As described below, the system 1 of the present invention uses specially formatted program files and load modules.

As shown in FIG. 6, load modules 81 contain a small MVS program 81a at the beginning of the file, and the back-end computer executable program 81b behind that. The small MVS program 81a gets loaded into the storage 22 from DASD 25 in the front-end computer 2 and started by MVS 50. This program 81a actually invokes the system job controller 75 which sets up a special environment in the MVS address space (e.g. loading the system data management service programs 90) to support the program 80 which will actually be sent over to the back-end computer 3 for execution.

The back-end computer job server 62 sets up the front-end runtime environment for job 80. This includes loading the front-end computer data manager code into the address space and setting up all the control blocks which are used by the front-end computer 2 to support the back-end computer job 80. The main control blocks are the Job ID Table (JIT), and for each DD statement, a Function Control Table (FCT). These control blocks are used by the front-end computer job controller 75 to track the job 80 as it runs and for the HPPI controller 72 to route incoming communications and data from the back-end computer 3 to the correct job and file in the front-end computer 2. After setting up the front-end runtime environment, the front-end job controller 75 sends a job initiation request to the back-end computer 3. The back-end computer job controller 62 initiates the job 80 as a normal UNIX batch job and waits for it to complete.

When the back-end computer job 80 completes, the front-end computer job controller 75 cleans up all the resources used by the front-end computer support tasks. Similarly if the job 80 is canceled either by the front-end operator or the user, the front-end computer job controller 75 gets control via the standard MVS subsystem interface, tells the back-end computer job controller 62 to cancel the back-end computer job 80, and then cleans up.

Figure 7:
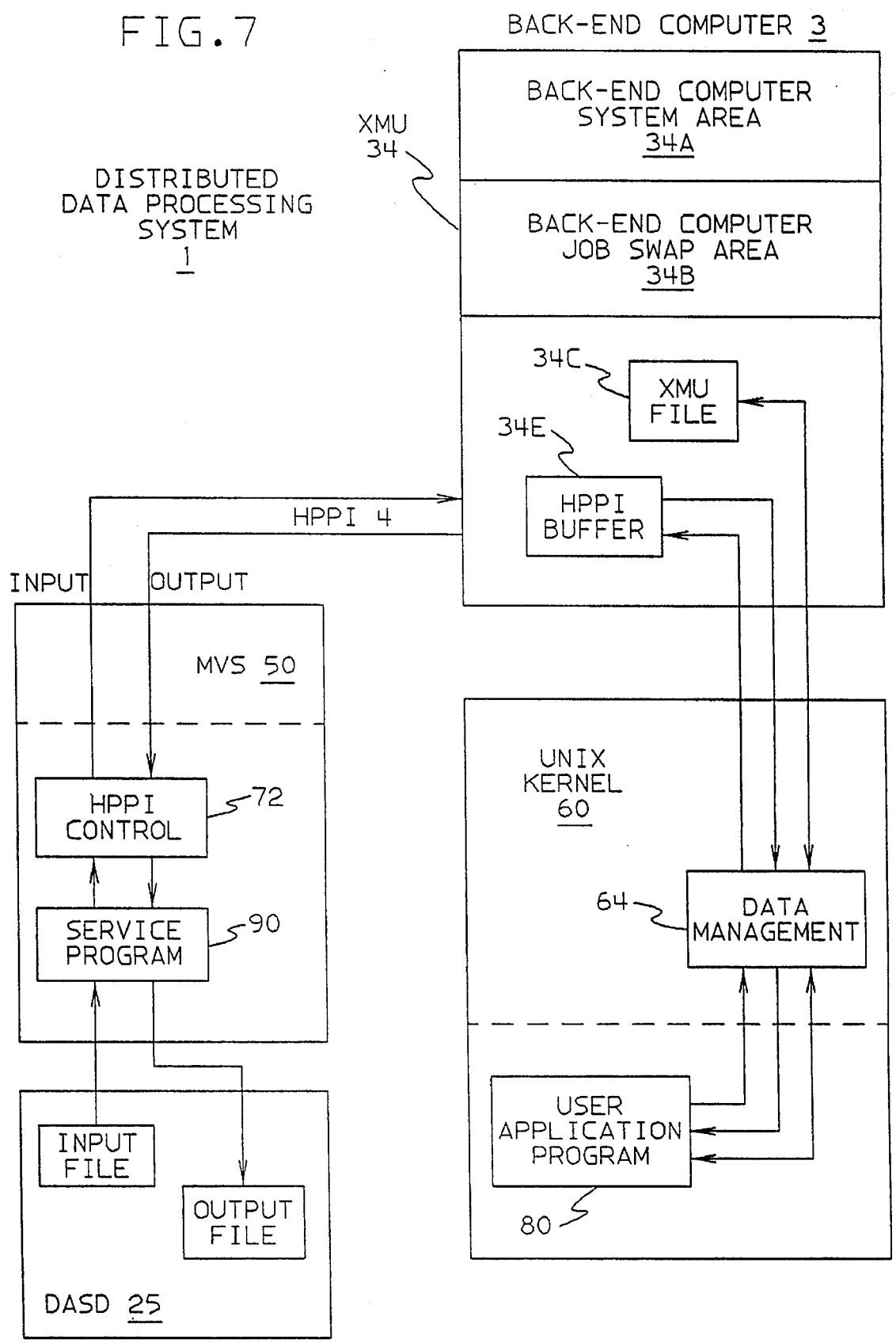
FIG. 7 is a schematic illustration of job execution in the system according to the preferred embodiment of the present invention.

The actual runtime environment for a job 80 is a very unique feature of the architecture of system 1. As shown in FIG. 7, at the operating system level, MVS 50 and UNIX 60, two jobs run in parallel, one job is service program 90 in MVS 50 and the other is parallel job 80 in the back-end UNIX system. The back-end computer job consists of the user's program 80. This program 80 runs in a standard runtime environment except for the I/O processing, which is handled by the back-end computer data management programs 64. As far as the MVS system 50 is concerned, the user's job 80 appears to be executing in the address space which MVS 50 provided. In fact, the front-end computer data management programs 79 run in the address space of service program 90 in MVS 50 while the user job 80 is running on the back-end computer 3. The advantage of this unique runtime environment is that even though the user job 80 is running under UNIX 60 on a totally different system, at the user interface and operator interface level, it appears the same as any other MVS job. It can be displayed by the MVS "display" or TSO/E "status" command, and can be canceled by the user or the operator just as any other MVS job.

File Specification for Back-End Jobs

One element of the Fortran compiler specification which is key to this invention is the file specification. The IBM Fortran file specification allows a file to be specified via DD (data definition) name within the Fortran program. The DD name is dynamically linked to a specific file name at the time the program is started. In the MVS system this is done via Job control language (JCL) "Data Definition" (DD) statements, or in an interactive environment via a file allocation command such as the "allocate" command in TSO/E. For example, the program may OPEN a file using a name such as "INFILE." In JCL the DD name INFILE is resolved to a specific file name, e.g. TEST.DATA.DEC1191, which is resolved by the MVS file system to one physical file via device information in the DD statement or else via catalog lookup.

The back-end runtime environment passes file access instructions from the user program 80 to the data management routines 64. For the file OPEN instruction in the user program 80, the DD name is passed as a parameter. The OPEN request is passed on the to the data manager 79 in the front end system 2, where the DD name is linked to a specific MVS file.

In this way it is possible to avoid the complications and difficulties of converting file names from one OS naming convention to the other OS naming convention. There is no need for MVS users to know or care about the conventions of files on the back-end computer 3, nor does the system 1 of the present invention have to enforce any kind of special file naming convention in order to make conversion possible.

File Concatenation

MVS JCL also permits file concatenation. Multiple libraries can be specified in a single DD statement, and the system searches them in the specified order to find a given member. With sequential files, concatenation permits multiple physical files to be used by a program as though they were one continuous file. The use of MVS file specification allows concatenation to be used by jobs 80 running under UNIX 90.

File Passing Between Multiple Jobsteps

Yet another key advantage of this file specification mechanism of this invention is that it also allows the system to easily support the passing of files between batch jobs steps. MVS JCL allows multiple programs to be executed by a single batch job, via the use of JCL jobsteps. The user can submit a single job request to the system which causes a sequence of programs to be executed serially. Each program or jobstep has its own DD statements associated with it. Within a single job, files can be passed from one jobstep to a subsequent jobstep. For example one jobstep may create a temporary dataset as an output file which is used to contain the results of intermediate calculations. The output file of this jobstep is retained and passed to a subsequent jobstep which uses the data as input for another set of calculations. The data is passed from one jobstep to the other by referring in the DD statement of the latter jobstep to the DD statement of the former step.

Using existing distributed processing system architectures, it would not be possible to map this type of batch jobstep and file passing mechanism into an different operating system with a different batch job processing system. But the unique system architecture of the present invention makes it easy. The different steps of a job submitted under MVS run on the back end as separate jobs. Within the UNIX system these jobs are separate and unrelated. But since they correspond to steps within the same MVS job, MVS file passing and temporary file definition JCL facilities can be used.

XMU File Management

In order to control the file allocation process completely from the MVS system, the front-end computer 2 controls the physical XMU 34 of the back-end computer 3. The XMU 34 is divided into two separate areas 34a, 34b and 34c, 34d, 34e: one belongs to the UNIX kernel 60 and the other belongs to the MVS system. The latter area is used to buffer data for MVS files and is controlled by the front-end computer 2.

There are several types of files in the latter area which can be used by the jobs. First, there are regular MVS files. MVS sequential data sets and partitioned data set members can be used for both input and output by the jobs. These files are dynamically read from (or written to) XMU buffers as needed to support read (or write) commands issued by user programs 80. As part of the file Open process, the MVS XMU manager 76 allocates space for these file buffers in the XMU 34.

"XMU files" can be allocated in the XMU 34 itself. The files are created by the system 1 when MVS 50 creates a data set on a designated disk volume 25, which has a unique qualifier in the dataset name. The volume name and dataset name are specified by the user. When the MVS system 50 allocates the disk file, the system 1 gets control through a standard user exit of the MVS disk file allocation process, and allocates file space in the XMU 34. The JCL space parameters (primary and secondary quantities) specified for the dataset in the JCL DD statement, are translated into quantities of XMU storage using a conversion factor. The name of the volume to be used for XMU files, the file name qualifier used to identify XMU files, and the space conversion factors used to convert blocks, tracks and cylinders into KB are installation specified parameters which can be set at system initialization time by the system programmer.

For these files, the MVS disk file acts merely as a place holder in the MVS file system (without such a place holder the MVS job initiation process would immediate terminate the job with a JCL error because the file specified in the user's JCL could not be found in the MVS file system), while the XMU file will actually be used for data. These XMU files form a an independent file system, distinct from both the UNIX file system and the MVS file system.

"XMU libraries" are another type of XMU file. These files too are completely resident in the XMU, and the total space for the library is allocated in the same way as is space for the XMU files. As with other XMU files, a corresponding MVS disk file exists—in this case an MVS library file, a partitioned data set (PDS). As in the case of an MVS partitioned dataset, XMU space within the XMU library is suballocated to members.

For each XMU library member a corresponding place holder member exists in the MVS disk PDS file. The PDS disk file itself is only a shadow of the actual XMU file—no real data is ever kept in the disk file. However, the PDS directory of the disk copy is updated and used by MVS 50 to verify the existence of members. As far as the back-end computer 3 is concerned, each XMU library member appears as and is used in the same way it was as a normal XMU file.

The XMU manager allocates space for the XMU library in the same way that space is allocated for other XMU files, except that, as is the case with MVS PDS files, for each member space is suballocated from the total space of the XMU library file.

The XMU files can be used in the following ways: To keep frequently used input data staged in the XMU (file caching). In this case, data must first be copied from other MVS disk files into the XMU file, using a special XMU file copy utility 77. To keep temporary files which are created by one program or jobstep and then used as input for a following program or jobstep. For job output. In this case the dataset must be copied to another MVS dataset in order to keep a permanent copy.

For each XMU file and each member of an XMU library, a header record is maintained by the front-end computer 2 which contains the information required by the back-end computer 3 to access the data. XMU file/buffer format is shown in FIG. 8.

Data Format

The back-end computer 3 can access MVS files of the following type and record format: sequential data set (record format F/FA/FB/FBA/FBS/V/VA/VB/VBA/VBS/U); direct data set (record format F); and partitioned data set (record format F/FA/FB/FBA/FBS/V/VA/VB/VBA/VBS/U).

When an MVS file is accessed by the back-end computer 3, the subject file's requested DASD blocks are moved to/from HPPI buffer area 34e in XMU 34. The DASD I/O block information is kept in these HPPI buffers 34e in order to keep MVS DASD I/O block image.

This record format is also kept for an XMU file in order to keep DASD I/O block information, even when an MVS file is copied to/from an XMU file. Back-end computer's Fortran runtime routine is modified in order to use these record format information in accessing both MVS and XMU files and doing blocking/deblocking from/to records.

Composite Load Modules

In order to initiate a program 80 from the front-end computer 2, it is necessary to first start a program which gives control to the system job manager 75. In order to make this process invisible to the end users, a composite load module structure 81 has been invented as explained hereinbefore in connection with FIG. 6. This structure 81 in FIG. 6 allows the user to manage back-end computer program files 80 the same as any MVS program files, and to initiate these programs 80 using standard MVS JCL. At the same time it solves the problem of getting control to the back-end job manager 62.

Unique system services are provided by this invention as follows to allow unique load module construct and its execution: utility to combine two load modules into a composite load module; MVS load module fetch function to fetch right portion of the composite load module; protocol to send right portion of the composite load module to the back-end computer 3; protocol to send execution environment to the back-end computer 3; load module linker (Linkage Editor) 78; utility to extract right portion from the composite load module and create library in the back-end computer 3; and utility to merge two libraries in two systems and create a library of the composite load modules.

Composite Load Module Construct

As explained before in connection with FIG. 6, the composite load module 81 consists of two parts, MVS load module part 81a and UNIX like load module part 81b. MVS load module part 81a will execute on the front-end computer 2 with MVS operating system 50. MVS load module part 81a will not execute on the back-end computer 3 because of hardware architecture difference. UNIX like load module part 81b will execute on the back-end computer 3 with its operating system 60. UNIX like load module part 81b will not execute on the front-end computer 2 because of hardware architecture difference.

MVS load module part 81a has U (Undefined) record format and UNIX like load module part 81b has F (Fixed Length) record format. The two load modules are concatenated, MVS part 81a first, and stored as a member in MVS partitioned data set library, system library. The system library has U record format and member name is the system load module name.

The composite load module is concatenation of two modules of different constructs. This can be easily expanded to concatenation of more than two load modules when directory entry of the system library is designed to contain pointers to sub-modules. The end of sub-module is identified by the end of module indicator in each sub-module, or pointer to next sub-module in the directory entry.

Utility to Concatenate Two Load Modules into One Composite Load Module

The load modules 81a and 81b that executes on each computer 2 and 3 are created and delivered independently in its own media. System utility 78 accepts the load modules 81a and 81b in two media to select right combination and concatenate them to create the composite load modules 81 and store them in system library. If a composite module has ALIAS it is identified and ALIAS entry is created in the system library directory entry.

In a more general case where more than two load modules need to be concatenated, utility similar to the utility 78 is required. The utility 78 of this invention is easily enhanced to process such environments.

Composite Load Module Fetch Operation

MVS batch job will specify a composite load module name in EXEC PGM=statement. TSO will specify the composite load module name in LOAD? command. MVS fetch routine starts to load the specified composite load module. Since beginning part of the composite load module is MVS load module, MVS fetch routine starts to load right load module. The fetch will stop at, EOM (End Of Module) record or at the end of ROOT segment if MVS load module has overlay structure. This is normal fetch operation and the composite load module construct does not cause Problem to MVS.

When jobs 80 in the back-end computer 3 fetch a composite load module 81, it initiates a composite load module read operation. The operation request is conveyed to the front-end computer 2 and BPAM read operation is performed against the specified composite load module member in system library. The back-end computer 3 requests only UNIX like load module portion 81b and need to strip off MVS load module portion 81a from the composite load module 81. MVS portion 81a is first part and the end of it can be detected in many ways. Some examples are, specifying block count of MVS portion in library directory entry or detection of EOM record. MVS and UNIX like module will use different block length. We also can design to address that target portion of module directory as follows: Library directory entry has pointer (for example TTR) to the target load module location. This construct allows handling of concatenation of more than two load modules. This system 1 uses "block count in directory." The composite load module 81 is read and MVS portion 81a is skipped and UNIX like module portion 81b is sent to the back-end computer 3.

System Linker to Create Composite Load Modules

A program usually called System Linker (or Linkage Editor) 78 creates the composite load modules. In the system 1, the Linker 78 itself is part of load module and operates in DDP environment. When (local) Linker creates load module, special Linker called System Linker 78 accepts the created load module and concatenate it with other load module to complete a composite load module.

Utility to Extract Right Portion from Composite Load Module and Create Load Module Library in the Back-End Computer For performance reason, it may be beneficial to have the load module library near local system so that it can be rapidly accessed. If this situation is desirable a utility is required to split system load module library into libraries and each library contains load modules that can execute on a specific computer. When system load module library is split the utility transfers the library to the back-end computer 3.

Utility to Merge the Libraries to Reconstruct System Load Module Library

The previous paragraph described split of the system load module library. The merge of such split libraries to one system load module library is required and a utility for merge is provided. The split of library is temporary status that is justified only for performance reason. The centralized control of composite load modules require system load module library. When the load modules in split libraries are updated the library merge utility need to be executed to create the latest version of system load module library.

Advantages of the Invention

According to the present invention, supercomputing jobs to be performed in a back-end computer running under the control of one operating system, e.g., UNIX operating system, can be submitted by a front-end computer running under the control of a different operating system, e.g., MVS operating system, by using standard front-end computer procedures, e.g., MVS Job Control Language (JCL) to specify the jobs and files to be used in the back-end computer. UNIX jobs are initialized and all files to be used are specified by using standard MVS JCL.

Moreover, files in the file system, e.g., MVS file system, of the front-end OS in the front-end computer are accessible to jobs, UNIX jobs, of the back-end OS in the back-end computer.

Furthermore, jobs in the back-end computer can also use special files which physically reside in the extended memory unit (XMU) of the back-end computer. These special files comprise a unique XMU file system which is created and managed by the front-end computer running under front-end operating system. These files are tied to the file system of the front-end operating system in that for each XMU file there is a corresponding disk file, a dummy disk file, for the front-end operating system. These dummy disk files act as place holders and allow the job to pass through the standard job initiation of the front-end operating system of the front-end computer to the back-end computer.

Furthermore, the extended memory unit (XMU) of the back-end computer is divided into two parts. One part is owned by the operating system of the back-end computer. The other part is managed by the operating system of the front-end computer and used for staging XMU files and for buffering standard files of the operating system of the front-end computer which are in use by the jobs of the operating system of the back-end computer.

Furthermore, there is provided a linker program which creates special load modules which include an executable load module of the front-end operating system and an executable load module of the back-end operating system appended within the same file. This special load module structure allows a supercomputer job to be initiated using standard JCL of the front-end operating system. The job initiator of the front-end operating system locates the load module within the file system of the front-end operating system, fetches it and starts execution. Thus, the load module of the front- end operating system gets control. The load module transfers control to the subsystem which communicates with the back-end operating system to initiate jobs of the back-end operating system.

Furthermore, job step image for front-end job step of the front-end operating system is realized by having a service program and data management program on the front-end computer for each job execution on the back-end computer.

What is claimed is:

1. A distributed data processing system for processing front-end jobs and back-end jobs submitted by a user comprising:

a front-end computer means, having a front-end file system and a front-end job control system, for initiating and executing said front-end jobs, and for initiating and controlling said back-end jobs using said front-end file system and said front-end job control system, said front-end computer means having a first operating system and a front-end storage;

a back-end computer means for executing said back-end jobs using back-end programs and back-end data files, said back-end computer means having processing resources and a second operating system different from said first operating system;

a non-volatile storage means, connected to said front-end storage and controlled by said front-end computer means, for storing said back-end programs and said back-end data files using said front-end file system;

a communication link connected between said front-end storage and controlled by said front-end computer means, for storing said back-end programs and said back-end data files using said front-end file system;

a communication link connected between said front-end computer means and said back-end computer means; and system control means, located in said front-end computer means, for creating a back-end address space in said back-end computer means in which said back-end jobs are executed on said back-end computer means by using said processing resources of said back-end computer means.

2. The distributed data processing system of claim 1 further including a data management program means, located in said front-end computer means, for controlling input/output operations for said back-end jobs and wherein said data management program means includes means for dynamically buffering said back-end data files during execution of said back-end jobs on said back-end computer means.

3. The distributed data processing system of claim 2 wherein said front-end computer means provides a user interface means for said system and said first operating system is a Multiple Virtual Storage operating system, and wherein said back-end computer means provides numerically intensive computing means for said system and said second operating system is a UNIX operating system.

4. The distributed data processing system of claim 2 further including a back-end storage device having two logical storage parts and wherein said first operating system has means for controlling one of said logical storage parts for communication between said front-end and said back-end computer means, and said second operating system has means for controlling the other of said logical storage parts for operation of said back-end computer means.

5. The distributed data processing system of claim 4 wherein said back-end storage device has means for storing said back-end programs and said back-end data files in said one of said logical storage parts using said front-end file system.

\* \* \* \* \*